United States Patent
Geerlings et al.

(10) Patent No.: US 7,722,850 B2
(45) Date of Patent: May 25, 2010

(54) PROCESS FOR SEQUESTRATION OF CARBON DIOXIDE BY MINERAL CARBONATION

(75) Inventors: Jacobus Johannes Cornelis Geerlings, Amsterdam (NL); Evert Wesker, Amsterdam (NL)

(73) Assignee: Shell Oil Company, Houston, TX (US)

( * ) Notice: Subject to any disclaimer, the term of this patent is extended or adjusted under 35 U.S.C. 154(b) by 194 days.

(21) Appl. No.: 11/561,921

(22) Filed: Nov. 21, 2006

(65) Prior Publication Data
US 2007/0261947 A1 Nov. 15, 2007

(30) Foreign Application Priority Data
Nov. 23, 2005 (EP) ................... 05111182

(51) Int. Cl.
*C01F 11/12* (2006.01)
*C01F 5/06* (2006.01)
*C10B 47/00* (2006.01)
*C10B 51/00* (2006.01)

(52) U.S. Cl. ................ 423/432; 201/14; 423/437.1
(58) Field of Classification Search ................ 423/432, 423/437.1; 201/14
See application file for complete search history.

(56) References Cited

U.S. PATENT DOCUMENTS

| | | | |
|---|---|---|---|
| 1,697,722 A | 1/1929 | Deguide | |
| 1,783,901 A | 12/1930 | Bottoms | |
| 1,934,472 A | 11/1933 | Allen et al. ................ | 23/150 |
| 4,124,683 A * | 11/1978 | Lalancette ................ | 423/166 |
| 4,230,765 A | 10/1980 | Takahashi et al. .......... | 428/283 |
| 4,670,474 A * | 6/1987 | Hinnenkamp et al. ....... | 518/713 |
| 4,696,803 A | 9/1987 | Nieh ................ | 423/228 |
| 5,806,298 A * | 9/1998 | Klosek et al. ................ | 60/776 |
| 7,244,867 B2 * | 7/2007 | Waycuilis ................ | 585/408 |
| 7,348,464 B2 | 3/2008 | Waycuilis ................ | 585/408 |
| 2002/0149353 A1 | 10/2002 | Inaba ................ | 323/283 |
| 2004/0126293 A1 | 7/2004 | Geerlings et al. .......... | 423/228 |
| 2004/0131531 A1 | 7/2004 | Geerlings et al. .......... | 423/430 |
| 2005/0002847 A1 * | 1/2005 | Maroto-Valer et al. ...... | 423/432 |
| 2005/0234276 A1 | 10/2005 | Waycuilis ................ | 585/310 |
| 2005/0234277 A1 | 10/2005 | Waycuilis ................ | 585/310 |
| 2006/0233687 A1 * | 10/2006 | Hojlund Nielsen ......... | 423/210 |
| 2008/0171898 A1 | 7/2008 | Waycuilis ................ | 585/18 |

FOREIGN PATENT DOCUMENTS

| | | |
|---|---|---|
| EP | 0321112 A1 | 6/1989 |
| EP | 0321112 | 3/1993 |
| EP | 0551876 A2 | 7/1993 |
| EP | 0551876 A3 | 7/1993 |
| EP | 1216744 A1 | 6/2002 |
| EP | 1245549 | 10/2002 |
| JP | 51125414 | 11/1976 |
| JP | 10249153 | 9/1997 |
| WO | WO9802714 | 1/1998 |
| WO | WO0046149 | 8/2000 |
| WO | WO0046164 | 8/2000 |
| WO | 02/085788 | 10/2002 |
| WO | WO2004037391 | 5/2004 |
| WO | WO2005104689 A2 | 11/2005 |
| WO | WO2005104689 A3 | 11/2005 |

OTHER PUBLICATIONS

Goldberg Philip: "Mineral Carbonation Study Program" (Online) Jul. 2000, XP002177995. Retrieved from the Internet: URL:http://www.fetc.doe.gov/publications/factsheets/program/prog006.pdf> (retrieved on Sep. 29, 2001) *the whole document*.
"Application of a Signal Reconstruction Method to Evaluate Pulsed Eddy-Current Signals" by H.M. Thomas and G. Wittig. NDT International. vol. 18, No. 5, Oct. 1985. pp. 251-255.
Peter C. Hewlett. "Lea's Chemistry of Cement and Concrete". $4^{th}$ Ed. , 1998 (John Wiley & Sons). pp. 805-807.
W. K. O'Connor. et al . "$CO_2$ Storage in Solid Form: A Study of Direct Mineral Carbonation". Albany Research Center. U.S. Dept. of Energy. $5^{th}$ International Conference on Greenhouse Gas Technologies. Cairns. Australia. Aug. 14-18, 2000.
Richard P. Walters et al., "Mineral Carbonation: A Viable Method for CO2 Sequestration", 1999, Internet site: http://web.archive.org/web/20010224101527/http://www.netl.doe.gov/products/gcc/indepth/mineral/mincarb.html.
M.M. Maroto-Valer et al., "Activation of magnesium rich minerals as carbonation feedstock materials for $CO_2$ sequestration", Fuel Processing Technology 86, 2005, Elsevier, pp. 1627-1645.

* cited by examiner

*Primary Examiner*—Jerry Lorengo
*Assistant Examiner*—Joseph V Micali
(74) *Attorney, Agent, or Firm*—Charles W. Stewart

(57) ABSTRACT

The invention provides a process for sequestration of carbon dioxide by mineral carbonation comprising the following steps:
(a) converting a magnesium or calcium sheet silicate hydroxide into a magnesium or calcium ortho- or chain silicate by bringing the silicate hydroxide in direct or indirect heat-exchange contact with hot synthesis gas to obtain the silicate, silica, water and cooled synthesis gas;
(b) contacting the silicate obtained in step (a) with carbon dioxide to convert the silicate into magnesium or calcium carbonate and silica.

20 Claims, No Drawings

PROCESS FOR SEQUESTRATION OF CARBON DIOXIDE BY MINERAL CARBONATION

CROSS-REFERENCE TO RELATED APPLICATION

This application claims priority from European Patent Application No. 05111182.1, filed on Nov. 23, 2005, which is incorporated herein by reference.

FIELD OF THE INVENTION

The present invention provides a process for the sequestration of carbon dioxide by mineral carbonation.

BACKGROUND OF THE INVENTION

It is known that carbon dioxide may be sequestered by mineral carbonation. In nature, stable carbonate minerals and silica are formed by a reaction of carbon dioxide with natural silicate minerals:

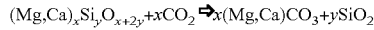
$$(Mg,Ca)_xSi_yO_{x+2y}+xCO_2 \rightarrow x(Mg,Ca)CO_3+ySiO_2$$

The reaction in nature, however, proceeds at very low reaction rates. The feasibility of such a reaction in process plants has been studied. These studies mainly aim at increasing the reaction rate.

The US department of energy has disclosed the reaction of finely ground serpentine ($Mg_3Si_2O_5(OH)_4$) or olivine ($Mg_2SiO_4$) in a solution of supercritical carbon dioxide and water to form magnesium carbonate. Under conditions of high temperature and pressure, 84% conversion of olivine has been achieved in 6 hours and a 80% conversion of pre-heated serpentine in less than an hour.

In WO02/085788, for example, is disclosed a process for mineral carbonation of carbon dioxide wherein particles of silicates selected from the group of ortho-, di-, ring, and chain silicates, are dispersed in an aqueous electrolyte solution and reacted with carbon dioxide.

It is known that orthosilicates or chain silicates can be relatively easy reacted with carbon dioxide to form carbonates and can thus suitably be used for carbon dioxide sequestration. Examples of magnesium or calcium orthosilicates suitable for mineral carbonation are olivine, in particular forsterite, and monticellite. Examples of suitable chain silicates are minerals of the pyroxene group, in particular enstatite or wollastonite. The more abundantly available magnesium or calcium silicate hydroxide minerals, for example serpentine and talc, are sheet silicates and are therefore more difficult to convert into carbonates. A very high activation energy is needed to convert these sheet silicate hydroxides into their corresponding ortho- or chain silicates.

SUMMARY OF THE INVENTION

It has now been found that abundantly available sheet silicate hydroxides such as serpentine or talc can be advantageously converted into their corresponding silicates by using heat available in hot synthesis gas. The thus-formed silicate is an ortho- or chain silicate and can be carbonated in a mineral carbonation step.

Accordingly, the present invention provides a process for sequestration of carbon dioxide by mineral carbonation comprising the following steps:

(a) converting a magnesium or calcium sheet silicate hydroxide into a magnesium or calcium ortho- or chain silicate by bringing the silicate hydroxide in direct or indirect heat-exchange contact with hot synthesis gas to obtain the silicate, silica, water and cooled synthesis gas;

(b) contacting the silicate obtained in step (a) with carbon dioxide to convert the silicate into magnesium or calcium carbonate and silica.

An advantage of the process of the invention is that hot synthesis gas can be effectively cooled whilst the desired conversion of sheet silicate hydroxides into the corresponding ortho- or chain silicates is accomplished.

Another advantage is that hot synthesis gas is typically available at locations where carbon dioxide is produced, especially in case the synthesis gas is obtained via coal gasification.

DETAILED DESCRIPTION OF THE INVENTION

In the process according to the invention a magnesium or calcium sheet silicate hydroxide mineral is first converted in conversion step (a) into a magnesium or calcium ortho- or chain silicate mineral by bringing the silicate hydroxide in heat-exchange contact with hot synthesis gas. The thus-formed silicate is then contacted with carbon dioxide to convert the silicate into magnesium or calcium carbonate and silica in mineral carbonation step (b).

Silicates are composed of orthosilicate monomers, i.e. the orthosilicate ion $SiO_4^{4-}$ which has a tetrahedral structure. Orthosilicate monomers form oligomers by means of O—Si—O bonds at the polygon corners. The $Q^s$ notation refers to the connectivity of the silicon atoms. The value of superscript s defines the number of nearest neighbour silicon atoms to a given Si. Orthosilicates, also referred to as nesosilicates, are silicates which are composed of distinct orthosilicate tetrahedra that are not bonded to each other by means of O—Si—O bonds ($Q^0$ structure). Chain silicates, also referred to as inosilicates, might be single chain ($SiO_3^{2-}$ as unit structure, i.e. a $(Q^2)_n$ structure) or double chain silicates ($(Q^3Q^2)_n$ structure). Sheet silicates, also referred to as phyllosilicates, have a sheet structure $(Q^3)_n$.

Above a certain temperature, sheet silicate hydroxide is converted into its corresponding ortho- or chain silicate, silica and water. Serpentine for example is converted at a temperature of at least 600° C. into olivine. Talc is converted at a temperature of at least 800° C. into enstatite. Therefore, the hot synthesis gas has a temperature of at least 600° C. for serpentine conversion and a temperature of at least 800° C. for talc conversion. Preferably the hot synthesis gas has a temperature in the range of from 900 to 1600° C., in order to attain the temperature required for the conversion.

Preferably, conversion step (a) is carried out by directly contacting hot synthesis gas with a fluidised bed of silicate hydroxide particles. Direct heat transfer from hot gas to solid mineral particles in a fluidised bed is very efficient. By controlling the continuous supply and discharge of synthesis gas and mineral particles to and from the fluidised bed, a constant bed temperature can be maintained.

It will be appreciated that the temperature of the cooled synthesis gas will depend on, inter alia, the synthesis gas-to-mineral ratio and the temperature of the hot synthesis gas. Typically, the cooled synthesis gas has a temperature of at least 550° C., preferably a temperature in the range of from 550 to 800° C.

The magnesium silicate hydroxide particles in the fluidised bed preferably have an average diameter in the range of from 30 to 300 μm, more preferably of from 50 to 150 μm. Reference herein to average diameter is to the volume medium diameter D(v, 0.5), meaning that 50 volume % of the particles have an equivalent spherical diameter that is smaller than the average diameter and 50 volume % of the particles have an equivalent spherical diameter that is greater than the average diameter. The equivalent spherical diameter is the diameter calculated from volume determinations, e.g. by laser diffraction measurements.

In step (a) of the process according to the invention, silicate hydroxide particles of the desired size may be supplied to the fluidised bed. Alternatively, larger particles, i.e. up to a few mm, may be supplied to the fluidised bed. As a result of the expansion of the steam formed during the conversion reaction in step (a), the larger particles will fragment into the desired smaller particles.

Reference herein to magnesium or calcium silicate hydroxide is to silicate hydroxides comprising magnesium, calcium or both. Part of the magnesium or calcium may be replaced by other metals, for example iron, aluminium or manganese. Any magnesium or calcium silicate hydroxide belonging to the group of sheet silicates may be suitably used in the process according to the invention. Examples of suitable silicate hydroxides are serpentine, talc and sepiolite. Serpentine and talc are preferred silicate hydroxides. Serpentine is particularly preferred.

Serpentine is a general name applied to several members of a polymorphic group of minerals having essentially the same molecular formula, i.e. $(Mg,Fe)_3Si_2O_5(OH)_4$ or $Mg_3Si_2O_5(OH)_4$, but different morphologic structures. In step (a) of the process according to the invention, serpentine is converted into olivine. The olivine obtained in step (a) is a magnesium silicate having the molecular formula $(Mg,Fe)_2SiO_4$ or $Mg_2SiO_4$, depending on the iron content of the reactant serpentine. Serpentine with a high magnesium content, i.e. serpentine that has or deviates little from the composition $Mg_3Si_2O_5(OH)_4$, is preferred since the resulting olivine has the composition $Mg_2SiO_4$ (forsterite) and can sequester more carbon dioxide than olivine with a substantial amount of magnesium replaced by iron.

Talc is a mineral with chemical formula $Mg_3Si_4O_{10}(OH)_2$. In step (a) of the process according to the invention, talc is converted into enstatite, i.e. $MgSiO_3$.

If the silicate hydroxide is serpentine, conversion step (a), i.e. the conversion of serpentine into olivine, is preferably carried out at a temperature in the range of from 600 to 800° C. Below 600° C., there is no significant conversion of serpentine into olivine. Above 800° C., a crystalline form of olivine is formed that is more difficult to convert into magnesium carbonate than the amorphous olivine formed at a temperature below 800° C. Therefore, serpentine conversion step (a) is preferably carried out by directly contacting hot synthesis gas with a fluidised bed of serpentine particles, wherein the fluidised bed has a temperature in the range of from 600 to 800° C.

If the silicate hydroxide is talc, the fluidised bed preferably has a temperature in the range of from 800 to 1000° C.

In mineral carbonation step (b), the silicate formed in step (a) is contacted with carbon dioxide to convert the silicate into magnesium or calcium carbonate and silica.

In step (b), the carbon dioxide is typically contacted with an aqueous slurry of silicate particles. In order to achieve a high reaction rate, it is preferred that the carbon dioxide concentration is high, which can be achieved by applying an elevated carbon dioxide pressure. Suitable carbon dioxide pressures are in the range of from 0.05 to 100 bar (absolute), preferably in the range of from 0.1 to 50 bar (absolute). The total process pressure is preferably in the range of from 1 to 150 bar (absolute), more preferably of from 1 to 75 bar (absolute).

A suitable operating temperature for mineral carbonation step (b) is in the range of from 20 to 250° C., preferably of from 100 to 200° C.

Synthesis gas is a gaseous mixture of carbon monoxide and hydrogen, optionally also comprising carbon dioxide and steam, that is usually obtained by partial oxidation or gasification of a hydrocarbonaceous feedstock. The hydrocarbonaceous feedstock may for example be natural gas or other light hydrocarbon streams, liquid hydrocarbons, biomass, or coal. Synthesis gas is typically applied for synthesis of hydrocarbons by the Fischer-Tropsch process, other chemical synthesis processes, power generation in gas turbines or for hydrogen production. If the carbon monoxide to hydrogen in the synthesis gas is too large for the envisaged application, part of the carbon monoxide in the synthesis gas may be converted into hydrogen by subjecting the synthesis gas to water-gas shift conversion. In the water-gas shift reaction, carbon monoxide and water are catalytically converted into carbon dioxide and hydrogen according to:

$$CO + H_2O \rightleftharpoons CO_2 + H_2$$

Water-gas shift conversion is typically carried out at a temperature in the range of from 250 to 500° C. The carbon monoxide to hydrogen ratio in the synthesis gas depends on the carbon-to-hydrogen ratio in the hydrocarbonaceous feedstock from which the synthesis gas is produced. In particular synthesis gas obtained by coal gasification has a high carbon monoxide to hydrogen ratio and needs to be subjected to a water-gas shift reaction to obtain the desired $CO/H_2$ ratio for example Fischer-Tropsch hydrocarbon synthesis. If hydrogen is the desired product, all carbon monoxide in the synthesis gas may be converted into carbon dioxide by water-gas shift conversion.

The process according to the invention is particularly suitable to sequester the carbon dioxide obtained by water-gas shift conversion of synthesis gas, in particular of synthesis gas obtained by coal gasification. Therefore, the cooled synthesis gas that is obtained in conversion step (a) of the process according to the invention is preferably subjected to water-gas shift conversion to obtain carbon dioxide and hydrogen-enriched synthesis gas and the carbon dioxide obtained in the water-gas shift conversion is contacted with the silicate in mineral carbonation step (b). Water obtained in conversion step (a) may suitably be used as reactant in the water-gas shift conversion.

The hot synthesis gas that is brought in heat-exchange contact with the silicate hydroxide is preferably synthesis gas obtained by coal gasification, i.e. partial oxidation of coal.

In a particularly preferred embodiment of the invention, hot synthesis gas obtained from coal gasification is used in conversion step (a), the cooled synthesis gas obtained in step (a) is subjected to water-gas shift conversion to obtain carbon dioxide and hydrogen-enriched synthesis gas, carbon dioxide obtained in the water-gas shift conversion is contacted with the silicate in mineral carbonation step (b), and the hydrogen-enriched synthesis gas is converted into hydrocarbons by a Fischer-Tropsch process. Preferably, the carbon dioxide is separated from the hydrogen-enriched synthesis gas before being contacted with the silicate.

In other embodiments of the invention, the process is combined with power generation in a gas turbine. If the synthesis gas is to be applied for power generation in a gas turbine, the cooled synthesis gas obtained in step (a) may be supplied to the gas turbine. Carbon monoxide in the synthesis gas will then be converted into carbon dioxide and discharged with the flue gas of the gas turbine. The carbon dioxide containing flue gas may then be contacted with the silicate in mineral carbonation step (b). Alternatively, the cooled synthesis gas is subjected to water-gas shift conversion to convert the carbon monoxide into carbon dioxide. Carbon dioxide is then separated from the shifted synthesis gas to obtain a concentrated stream of carbon dioxide and hydrogen-enriched synthesis gas. The hydrogen-enriched synthesis gas is then supplied to the gas turbine. The concentrated stream of carbon dioxide is contacted with silicate in mineral carbonation step (b).

The cooled synthesis gas obtained in the process according to the invention may be further cooled by bringing it in heat exchange contact with silicate hydroxide particles to be supplied to conversion step (a), thereby pre-heating the silicate hydroxide to be converted.

Example

The process according to the invention will be further illustrated by the following non-limiting example.

Synthesis gas obtained by coal gasification typically has the following composition: 65 mole % CO; 25 mole % $H_2$; 5 mole % $N_2$; 1.5 mole % $CO_2$; 2.5 mole % $H_2O$; and 1.0 mole % $H_2S$. If 100 kmol of such synthesis gas is cooled from 1500 to 600° C., 3164.9 MJ heat is available and 2394 kg serpentine can be converted into olivine. In order to obtain the desired carbon monoxide-to-hydrogen ratio for Fischer-Tropsch synthesis, 35 kmol carbon monoxide has to be shifted to carbon dioxide. Thus, the total amount of carbon dioxide in the shifted synthesis gas is 36.5 kmol or 1606.4 kg. With the amount of olivine available, 1142.4 kg carbon dioxide can be converted into magnesium carbonate. Thus, 71% of the carbon dioxide that is present in the shifted synthesis gas can be sequestered with the process according to the invention.

What is claimed is:

1. A process for sequestration of carbon dioxide by mineral carbonation comprising the following steps:
   (a) converting a magnesium or calcium sheet silicate hydroxide into a magnesium or calcium ortho- or chain silicate by bringing the silicate hydroxide in direct or indirect heat-exchange contact with hot synthesis gas to obtain the silicate, silica, water and cooled synthesis gas;
   (b) contacting the silicate obtained in step (a) with carbon dioxide to convert the silicate into magnesium or calcium carbonate and silica.

2. A process according to claim 1, wherein the silicate hydroxide is serpentine and the silicate is olivine.

3. A process according to claim 1, wherein the silicate hydroxide is talc and the silicate is enstatite.

4. A process according to claim 1, wherein the hot synthesis gas has a temperature in the range of from 900 to 1600° C.

5. A process according to claim 1, wherein the cooled synthesis gas has a temperature of at least 550° C.

6. A process according to claim 1, wherein step (a) is carried out by directly contacting hot synthesis gas with a fluidised bed of silicate hydroxide particles.

7. A process according to claim 6, wherein the fluidised bed has a temperature in the range of from 600 to 800° C. and wherein the silicate hydroxide is serpentine and the silicate is olivine.

8. A process according to claim 6, wherein the fluidised bed has a temperature in the range of from 800 to 1000° C. and wherein the silicate hydroxide is talc and the silicate is enstatite.

9. A process according to claim 6, wherein the silicate hydroxide particles have an average diameter in the range of from 30 to 300 µm.

10. A process according to claim 1, wherein the cooled synthesis gas is subjected to water-gas shift conversion to obtain carbon dioxide and hydrogen-enriched synthesis gas and wherein carbon dioxide obtained in the water-gas shift conversion is contacted with the silicate in step (b).

11. A process according to claim 10, wherein water obtained in step (a) is used as reactant for the water-gas shift conversion.

12. A process according to claim 1, wherein the hot synthesis gas is obtained by coal gasification.

13. A process according to claim 10, wherein the hydrogen-enriched synthesis gas is converted into hydrocarbons by a Fischer-Tropsch process and wherein the hot synthesis gas is obtained by coal gasification.

14. A process according to claim 10, wherein hydrogen is produced from the hydrogen-enriched synthesis gas and wherein the hot synthesis gas is obtained by coal gasification.

15. A process according to claim 10, wherein the hydrogen-enriched synthesis gas is supplied to a gas turbine to generate power and wherein the hot synthesis gas is obtained by coal gasification.

16. A process according to claim 1, wherein the cooled synthesis gas is further cooled in heat-exchange contact with silicate hydroxide that is to be supplied to step (a).

17. A process according to claim 1, wherein the cooled synthesis gas has a temperature in the range of from 550 to 800° C.

18. A process according to claim 6, wherein the silicate hydroxide particles have an average diameter in the range of from 50 to 150 µm.

19. A process according to claim 2, wherein the hot synthesis gas has a temperature in the range of from 900 to 1600° C.

20. A process according to claim 3, wherein the hot synthesis gas has a temperature in the range of from 900 to 1600° C.

* * * * *